United States Patent
Bertens

(10) Patent No.: US 9,721,329 B2
(45) Date of Patent: Aug. 1, 2017

(54) IMAGE DE-NOISING METHOD

(71) Applicant: Agfa HealthCare NV, Mortsel (BE)

(72) Inventor: Tom Bertens, Mortsel (BE)

(73) Assignee: AGFA HEALTHCARE NV, Mortsel (BE)

( * ) Notice: Subject to any disclaimer, the term of this patent is extended or adjusted under 35 U.S.C. 154(b) by 0 days.

(21) Appl. No.: 15/030,421

(22) PCT Filed: Nov. 12, 2014

(86) PCT No.: PCT/EP2014/074316
§ 371 (c)(1),
(2) Date: Apr. 19, 2016

(87) PCT Pub. No.: WO2015/071282
PCT Pub. Date: May 21, 2015

(65) Prior Publication Data
US 2016/0275655 A1    Sep. 22, 2016

(30) Foreign Application Priority Data
Nov. 18, 2013  (EP) ..................................... 13193290

(51) Int. Cl.
*G06K 9/40*    (2006.01)
*G06T 5/00*    (2006.01)
*G06T 5/20*    (2006.01)

(52) U.S. Cl.
CPC ............... *G06T 5/002* (2013.01); *G06T 5/20* (2013.01); *G06T 2207/10116* (2013.01); *G06T 2207/20012* (2013.01); *G06T 2207/20016* (2013.01); *G06T 2207/20064* (2013.01); *G06T 2207/20192* (2013.01)

(58) Field of Classification Search
CPC . G06T 5/002; G06T 5/20; G06T 2207/10116; G06T 2207/20192
USPC .......................................................... 382/275
See application file for complete search history.

(56) References Cited

U.S. PATENT DOCUMENTS

2011/0187902 A1* 8/2011 Adams, Jr. .............. G06T 5/002
                                                         348/241

FOREIGN PATENT DOCUMENTS

| EP | 1 933 272 A1 | 6/2008 |
| EP | 1 933 273 A1 | 6/2008 |
| EP | 2 026 278 A1 | 2/2009 |
| EP | 2 048 616 A1 | 4/2009 |

OTHER PUBLICATIONS

Official Communication issued in International Patent Application No. PCT/EP2014/074316, mailed on Feb. 5, 2015.
(Continued)

*Primary Examiner* — Ruiping Li
(74) *Attorney, Agent, or Firm* — Keating and Bennett, LLP

(57) ABSTRACT

A multi-scale detail representation of an image is computed as a weighted sum of translation difference images. A denoising operator is applied to the translation difference images so that translation differences are modified as a function of an estimated local signal-to-noise ratio and at least one denoised center difference image at a specific scale is computed by combining denoised translation difference images at scale s or a finer scale. A denoised image is computed by applying a reconstruction algorithm to the denoised center difference images.

8 Claims, 4 Drawing Sheets

(56) References Cited

OTHER PUBLICATIONS

Ranganath, "Image Filtering Using Multiresolution Representations", IEEE Transactions on Pattern Analysis and Machine Intelligence, May, 13, 1991, pp. 426-440.

* cited by examiner

| d-3,-3 | d-3,-2 | d-3,-1 | d-3,0 | d-3,1 | d-3,2 | d-3,3 |
|---|---|---|---|---|---|---|
| d-2,-3 | d-2,-2 | d-2,-1 | d-2,0 | d-2,1 | d-2,2 | d-2,3 |
| d-1,-3 | d-1,-2 | d-1,-1 | d-1,0 | d-1,1 | d-1,2 | d-1,3 |
| d0,-3 | d0,-2 | d0,-1 | 0 | d0,1 | d0,2 | d0,3 |
| d1,-3 | d1,-2 | d1,-1 | d1,0 | d1,1 | d1,2 | d1,3 |
| d2,-3 | d2,-2 | d2,-1 | d2,0 | d2,1 | d2,2 | d2,3 |
| d3,-3 | d3,-2 | d3,-1 | d3,0 | d3,1 | d3,2 | d3,3 |

FIG. 3

IMAGE DE-NOISING METHOD

CROSS-REFERENCE TO RELATED APPLICATIONS

This application is a 371 National Stage Application of PCT/EP2014/074316, filed Nov. 12, 2014. This application claims the benefit of European Application No. 13193290.7, filed Nov. 18, 2013, which is incorporated by reference herein in its entirety.

BACKGROUND OF THE INVENTION

1. Field of the Invention

The present invention relates to a method for removing noise from an image, more specifically a medical image, represented by a digital signal representation.

2. Description of the Related Art

Commonly images such as medical radiographic images represented by a digital signal are subjected to image processing during or prior to displaying or hard copy recording.

One of the steps in the image enhancement process is image restoration.

Digital images may be degraded by noise.

Due to the strong focus on dose limitation in radiographic imaging, more and more radiographic images are taken at a lower dose resulting in higher noise content.

Therefore image denoising is a major concern in the process of visualization enhancement of radiographic images.

Over the years multiple image denoising techniques have been published. They are formulated both in the spatial domain and in the frequency domain.

Despite of the strong progress already made, research institutes continue the search for more efficient denoising methods.

State-of-the-art denoising algorithms often make assumptions about the noise model and are therefore not generally applicable.

The challenge is to suppress the noise without creating artefacts or removal of fine image structures.

A large category of promising image denoising techniques are multiscale based methods like Multiscale adaptive thresholding, Bayesian wavelet shrinkage, etc.

European patent EP 1933272 describes a new technique for multiscale contrast enhancement based on translation difference images.

In a conventional multiscale image processing method an image, represented by an array of pixel values, is processed by applying the following steps. First the original image is decomposed into a sequence of detail images at multiple scales and occasionally a residual image. Next, the pixel values of the detail images are modified by applying to these pixel values at least one conversion. Finally, a processed image is computed by applying a reconstruction algorithm to the residual image and the modified detail images.

The new technique described in the above mentioned patent EP 1933272 provides a method wherein a reversible multi-scale detail representation is computed as a weighted sum of translation difference images.

The weighing factors and the translation offsets of the translation difference images are deducted from the multi-scale decomposition in such a way that the resulting weighted sum of the translation difference images is identical to or an approximation of the pixel values in the detail images.

SUMMARY OF THE INVENTION

It is an aspect of the present invention to elaborate the above-described techniques further so as to achieve efficient image denoising with preservation of the fine image structures.

The above-mentioned aspects are realised by a denoising method as set out below.

Specific features for preferred embodiments of the invention are also set out below.

Further advantages and preferred embodiments of the present invention will become apparent from the following description and drawings.

The present invention is applicable to all the multi-scale detail representation methods from which the original image can be computed by applying the inverse transform.

The invention is applicable to all the multi-scale decomposition methods wherein detail pixel values are equivalent to the sum of corresponding pixel values translation difference images or can be computed as pixels of a center difference image.

The present invention is generally implemented as a computer program product adapted to carry out the method of any of the claims when run on a computer and is stored on a computer readable medium.

In the context of the present invention specific terms are defined as follows:

Multi-scale decomposition mechanism: A multi-scale (or multi-resolution) decomposition of an image is a process that computes detail images of said image at multiple scales of a grey value image. A multi-scale decomposition mechanism generally involves filter banks for computing the detail images. Well-known techniques are: the Laplacian pyramid, the Burt pyramid, the Laplacian stack, the wavelet decomposition, QMF filter banks.

Approximation image: An approximation image is a grey value image that represents an original grey value image at the same or a larger scale, or at the same or a lower resolution. An approximation image at a specific scale is equivalent to the original grey value image in which all details at that scale have been omitted (Mallat S. G., "A Theory for Multiresolution Signal Decomposition: The Wavelet Representation", IEEE Trans. On Pattern Analysis and Machine Intelligence, vol. 11, no. 7, July 1989).

Detail image: A detail image is defined as the difference of information between an approximation image at a certain scale and an approximation image at a smaller scale.

Translation difference image: Translation difference images at a scale s are a measurement of elementary contrast in each pixel of an approximation image at scale s. They can be computed by taking the difference of the approximation image at that scale s and a translated version. Other computations for elementary contrast are possible, e.g. the ratio of pixel with a neighboring pixel can be used in case the processing steps are preceded by an exponential transform and followed by a log transform.

Center difference image: A center difference image is computed by applying a combining operator (for example a summation) to translation difference images. The combining operator can be a linear or non-linear function of corresponding pixel values in the translation difference images.

BRIEF DESCRIPTION OF THE DRAWINGS

FIG. 3 shows a local neighbourhood around a pixel. The translation difference of interest is indicated by the pixel pair with bold border and the corresponding selection of translation differences T involved in the noise correction operator are indicated by the dashed borders.

DETAILED DESCRIPTION OF THE PREFERRED EMBODIMENTS

Figure 1:
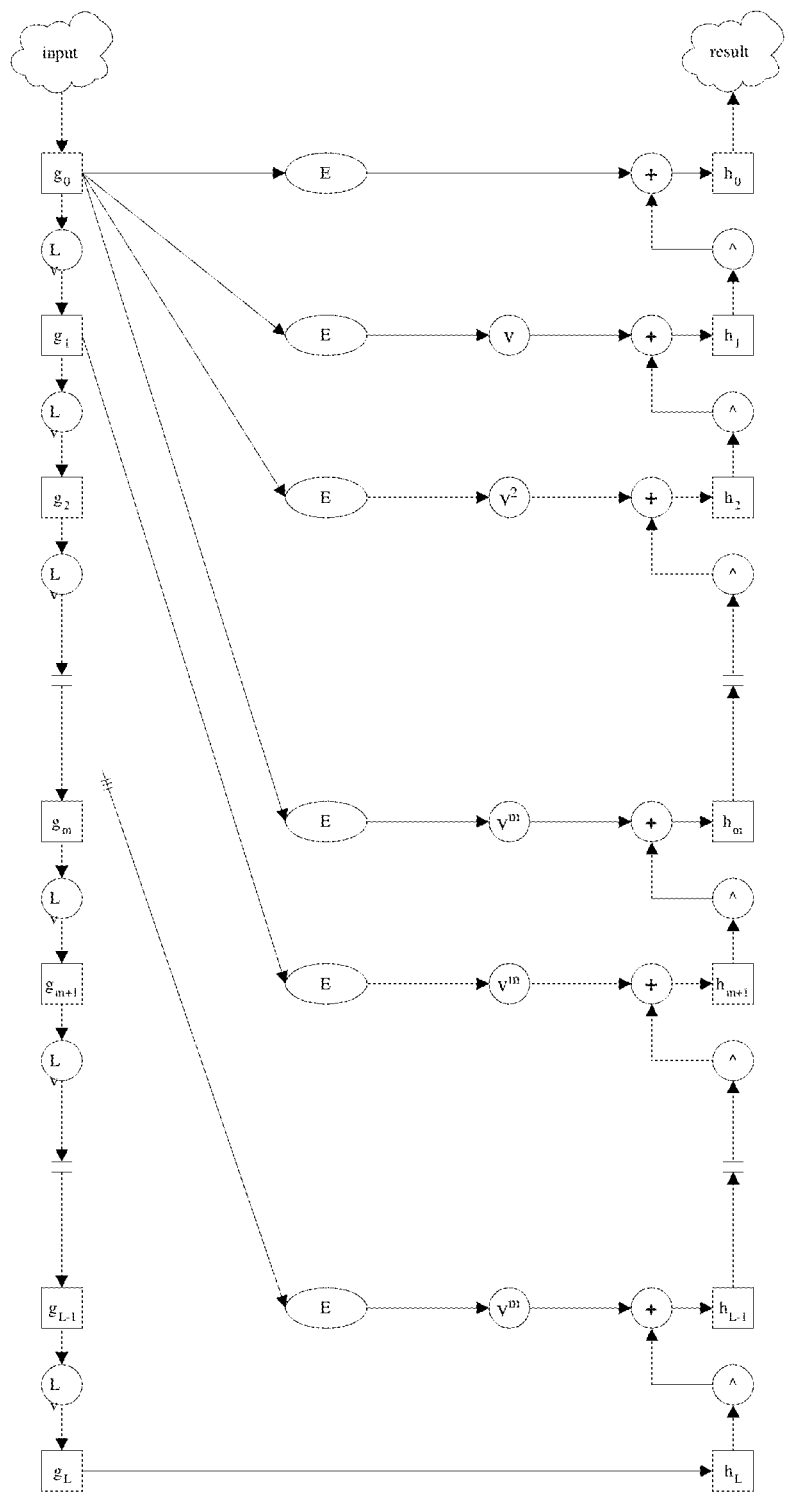
FIG. 1 illustrates how a center difference image at scale k is computed out of the approximation image at scale k-m.
Figure 2:
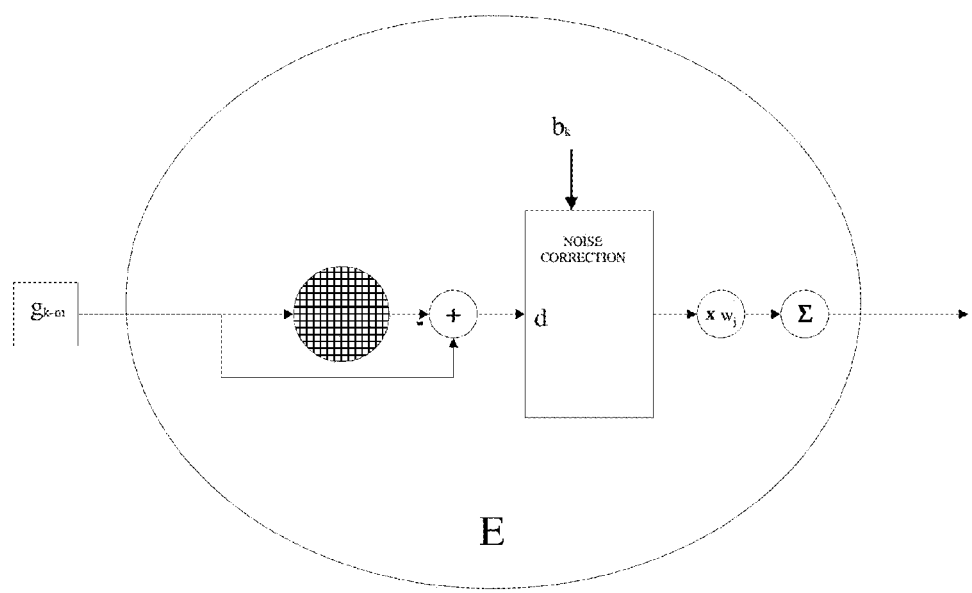
FIG. 2 illustrates a method of the present invention for noise correction making use of translation differences derived from approximation images at the same or finer scale.
Figure 4:
FIG. 4 is a legenda.

The multi-scale image processing based on the translation difference images that are combined to center differences creates the possibility to reduce the noise present in the digital image.

It is applicable to a reversible multi-scale detail representation that can be computed as a weighted sum of translation difference images.

The weighing factors and the translation offsets of the translation difference images can be deducted from the multi-scale decomposition in such a way that the resulting weighted sum of the translation difference images is identical to or an approximation of the detail pixel values.

To compute the weighted sum of translation difference images, the approximation image at the same scale (or resolution level) or the approximation images at the smaller scales (or finer resolution levels) can be used.

For these multi-scale detail representations the noise can be reduced by applying a noise correction operator to the translation difference images before the weighted sum is computed.

The pixel value at position i,j in the detail image $d_k$ can be computed out of an approximation image $g_l$ at the same or finer scale $l \in \{0, \ldots, k\}$:

$$d_k(i, j) = c_k(i, j)$$
$$= \sum_m \sum_n w_{m,n}(g_l(ri, rj) - g_l(ri+m, rj+n))$$

The term $g_l(ri,rj) - g_l(ri+m,rj+n)$ is called a translation difference.

It expresses the difference in pixel value between a central pixel and a neighbouring pixel in an approximation image. It is a measure of local signal variation.

The weighted sum of the translation differences is called a centre difference $c_k(i,j)$.

In a first preferred embodiment for each pixel position i,j in the detail image the weights $w_{m,n}$ are computed such that the weighted sum of the translation differences matches exactly the pixel values in the detail image.

In a second preferred embodiment the strict criteria for the weights $w_{m,n}$ is not enforced.

The center difference $c'_k(i,j)$, which is in this preferred embodiment computed as weighted sum of a selection of translation differences, is an approximation of the corresponding pixel value in the detail image $d_k(i,j)$. By using a reduced selection of translation differences, a trade-off is generated between the speed and the quality of the multi-scale denoising.

After denoising, each center difference $c''_k(i,j)$ is preferably corrected by applying a multiplicative correction factor $d_k(i,j)/c'_k(i,j)$.

The local pixel differences reflected in the translation differences $g_l(ri,rj) - g_l(ri+m,rj+n)$ can be due to both noise and signal variations.

To reduce the noise, translation differences are individually compared to other translation differences in a local neighbourhood.

The local neighbourhood is defined by the extent of the selection of translation differences used to compute the center difference $c_k(i,j)$.

According to a preferred embodiment of the method of the present invention, a translation difference is compared to the weighted average $ave_T$ of a selection of translation differences T in a local neighbourhood.

Translation differences with a magnitude larger than the magnitude of the average $ave_T$ of a selection of translation differences T in a local neighbourhood indicate strong signal variation and needs to be preserved.

Translation differences with a magnitude smaller than the magnitude of the average $ave_T$ indicate small noisy signal variations and can be reduced.

By choosing an appropriate correction operator, noise reduction can be achieved while preserving the fine detail structures in the image.

As a translation difference is defined as the difference between a central pixel and a neighbouring pixel in an approximation image, these 2 pixels define an orientation P.

In one preferred embodiment of the present invention, the selection of translation differences T is defined as the translation differences with an orientation Q approximately perpendicular to orientation P.

The weights to compute the weighted average $ave_T$ of the selection of translation differences T are defined as function of the pair-wise distance between the neighbouring pixels and the central pixel and (or) of the pair-wise differences between the 2 directions Q and P.

In a preferred embodiment the $ave_T$ is computed as:

$$ave_T = \sum_{(m,n) \in T} (g_l(ri, rj) - g_l(ri+m, rj+n)) * A * \sin(Q-P) * \text{Exp}\left(\frac{-(m^2+n^2)}{B}\right)$$

with A and B normalization constants.

The noise reduction can then be achieved by applying a multiplicative correction factor per translation difference. The correction factor is defined as function of the ratio of the magnitude of the translation difference and the magnitude of the average $ave_T$ of the selection of translation differences T.

In a preferred embodiment this function is:

$$\text{noise\_corr\_fact}(m, n) = \frac{|g_l(ri, rj) - g_l(ri+m, rj+n)|}{b_k * |ave_T|} - 1$$

with the multiplicative correction factor clipped between [0.0, 1.0].

Factor $b_k$ specifies the amount of noise reduction per scale.

The denoised centre differences are computed as the sum of the noise reduced translation difference images:

$$c_k(i, j) = \sum_m \sum_n w_{m,n} * (g_l(ri, rj) - g_l(ri+m, rj+n)) * \text{noise\_corr\_fact}(m, n)$$

Finally the denoised version of the image is computed by applying the multi-scale reconstruction to the denoised centre difference images, i.e. the addition of the interpolated denoised centre difference images to obtain the full-resolution image.

Having described in detail preferred embodiments of the current invention, it will now be apparent to those skilled in the art that numerous modifications can be made therein without departing from the scope of the invention as defined in the appending claims.

The invention claimed is:

1. A method of denoising an image represented by a digital signal representation, the method comprising the steps of:
creating at least one approximation image at at least one scale by applying a multi-scale decomposition algorithm to the image wherein all details of the at least one approximation image at a scale representing grey values of pixels of the image have been omitted;
creating translation difference images by pixel-wise subtracting values of the at least one approximation image at a scale s and values of a translated version of the at least one approximation image;
applying a denoising operator to translation difference values of the translation difference images so that the translation difference values are modified as a function of an estimated local signal-to-noise ratio to provide denoised translation difference images;
computing at least one denoised center difference image at a specific scale by combining the denoised translation difference images at scale s or a finer scale; and
computing a denoised image by applying a reconstruction algorithm which reverses the multi-scale decomposition algorithm to the at least one denoised center difference image; wherein
the estimated local signal-to-noise ratio is estimated by comparing a translation difference to a selection of translation differences in a local neighborhood of the translation difference.

2. The method according to claim 1, wherein the selection of translation differences is defined as the translation differences having an orientation approximately perpendicular to an orientation of a translation difference of interest.

3. The method according to claim 2, further comprising the step of comparing the translation differences to a weighted average of the selection of translation differences in the local neighborhood.

4. The method according to claim 3, wherein weights of the weighted average are a function of a pair-wise distance between neighboring pixels and a central pixel and/or pair-wise differences between an orientation of neighboring translation differences and the orientation of the translation difference of interest.

5. The method according to claim 3, wherein the denoising operator applies a multiplicative correction factor to the translation differences.

6. The method according to claim 4, wherein the multiplicative correction factor is a function of a ratio of a magnitude of the translation difference and a magnitude of the weighted average of the selection of translation differences in the local neighborhood.

7. The method according to claim 1, wherein the image is a radiographic image.

8. A non-transitory computer readable medium comprising computer executable code adapted to carry out the steps of the method of claim 1 when executed on a computer.

* * * * *